United States Patent
Lewis et al.

(10) Patent No.: US 6,560,574 B2
(45) Date of Patent: *May 6, 2003

(54) SPEECH RECOGNITION ENROLLMENT FOR NON-READERS AND DISPLAYLESS DEVICES

(75) Inventors: James R. Lewis, Delray Beach, FL (US); Huifang Wang, West Palm Beach, FL (US); Ron Van Buskirk, Indiantown, FL (US); Kerry A. Ortega, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,681

(22) Filed: Jul. 2, 2001

(65) Prior Publication Data

US 2002/0091519 A1 Jul. 11, 2002

Related U.S. Application Data

(62) Division of application No. 09/248,243, filed on Feb. 10, 1999, now Pat. No. 6,324,507.

(51) Int. Cl.[7] .............................................. G10L 15/26
(52) U.S. Cl. ...................................... 704/235; 704/270
(58) Field of Search ................................. 704/231, 235, 704/270, 275, 276; 379/88.01

(56) References Cited

U.S. PATENT DOCUMENTS

| | | | | | |
|---|---|---|---|---|---|
| 5,592,583 A | * | 1/1997 | Sakurai | ...................... | 704/200 |
| 5,812,977 A | * | 9/1998 | Russell | ........................ | 704/243 |
| 5,821,933 A | * | 10/1998 | Keller et al. | ................. | 345/741 |
| 5,850,629 A | * | 12/1998 | Holm et al. | ................. | 704/260 |
| 5,950,167 A | * | 9/1999 | Yaker | .......................... | 704/270 |
| 6,075,534 A | * | 6/2000 | VanBuskirk et al. | ........ | 345/835 |
| 6,173,266 B1 | * | 1/2001 | Marx et al. | ................. | 704/270 |
| 6,192,343 B1 | * | 2/2001 | Morgan et al. | ............. | 704/231 |
| 6,219,644 B1 | * | 4/2001 | VanBuskirk | ................. | 704/275 |
| 6,324,507 B1 | * | 11/2001 | Lewis et al. | ............. | 379/88.01 |

OTHER PUBLICATIONS

"Example Enrollment Text Playback for an Automatic Speech Recognizer," IBM Technical Disclosure Bulletin, vol. 36, No. 03, Mar. 1993, p. 413.*

* cited by examiner

Primary Examiner—Marsha D. Banks-Harold
Assistant Examiner—Martin Lerner
(74) Attorney, Agent, or Firm—Skerman Senterfitt (57) ABSTRACT

A method for enrolling a user in a speech recognition system, without requiring reading, comprises the steps of: generating an audio user interface having an audible output and an audio input; audibly playing a text phrase; audibly prompting the user to speak the played phrase; repeating the steps of audibly prompting the user not to speak, audibly playing the phrase and audibly prompting the user to speak, for a plurality of further phrases; and, processing enrollment of the user based on the audibly prompted and subsequently spoken phrases. A graphical user interface can also be generated for: displaying text corresponding to the phrases and to the audible prompts; displaying a plurality of icons for user activation; and, selectively distinguishing different ones of the icons at different times by at least one of: color; shape; and, animation.

20 Claims, 11 Drawing Sheets

SPEECH RECOGNITION ENROLLMENT FOR NON-READERS AND DISPLAYLESS DEVICES

CROSS REFERENCE TO RELATED APPLICATIONS

This Application is a division of U.S. patent application Ser. No. 09/248,243 filed Feb. 10, 1999, now U.S. Pat. No. 6,342,507.

BACKGROUND OF THE INVENTION

1. Field of the Invention

This invention relates generally to the field of speech recognition systems, and in particular, to speech recognition enrollment for non-readers and displayless devices.

2. Description of Related Art

Users of speech recognition programs need to enroll, that is provide a sample for processing by the recognition system, in order to utilize the speech recognition system with maximum accuracy. When a user can read aloud fluently, it is easy to collect such a sample. When the user cannot read fluently for any reason, or when the speech system does not provide for a display device, collecting such a sample has thus far not been practical. Speech recognition systems can be implemented in connection with telephone and centralized dictation systems, which need not have display monitors as part of the equipment.

Recent years have brought significant improvements to speech recognition software. Speech recognition software, also referred to as a speech recognition engine, constructs text from the acoustic signal of a user's speech, either for purposes of dictation or command and control. Current systems sometimes allow users to speak to the system using a speaker-independent model to allow users to begin working with the software as quickly as possible. However, recognition accuracy is best when a user enrolls with the system.

During normal enrollment, the system presents text to the user, and records the user's speech while the user reads the text. This approach works well provided that the user can read fluently. When the user is not fluent in the language for which the user is enrolling, this approach will not work.

There are many reasons why a user might be a less than fluent. The following list is exemplary: the user can be a child who is just beginning to read; the user can be a child or adult having one or more learning disabilities that make reading unfamiliar material difficult; the user can be a user who speaks fluently, but has trouble reading fluently; the user can be enrolling in a system designed to teach the user a second language; and, the user can be enrolling in a system using a device that has no display, so there is nothing to read.

There is a long-felt need to provide speech recognition enrollment for non-readers and for speech systems without display devices.

SUMMARY OF THE INVENTION

An enrollment system must have certain properties in addition to those in systems for fluent readers in order to support users who are non-readers and users without access to display devices. In accordance with the inventive arrangements, the most important additional property is an ability to read the text to the user before expecting the user to read the text. This can be accomplished by using text-to-speech (TTS) tuned to ensure that the audible output faithfully produces the words with the correct pronunciation for the text, or by using recorded audio. Given adequate system resources, recorded audio is presently preferred as sounding more natural, but in systems with limited resources, for example handheld devices in a client-server system, TTS can be a better choice.

Thus, the long-felt need of the prior art is satisfied by providing the enrollment text to the user via an audio channel, with adjustments to the standard user interface to provide for an easy-to-understand sequence of events.

A method for enrolling a user in a speech recognition system without requiring reading, in accordance with the inventive arrangements, comprises the steps of: generating an audio user interface having an audible output and an audio input; audibly playing a text phrase; audibly prompting the user to speak the played text phrase; repeating the steps of audibly playing the text phrase and audibly prompting the user to speak, for a plurality of further text phrases; and, processing enrollment of the user based on the audibly prompted and subsequently spoken text phrases.

The method can further comprise the step of audibly playing a further one of the plurality of further text phrases only if the spoken phrase was received.

The method can further comprise the step of repeating the steps of audibly playing the text phrase and audibly prompting the user to speak for the most recently played text phrase if the spoken text phrase was not received.

The method can further comprise the step of audibly prompting the user, prior to the audibly playing step, not to speak while the text phrase is played.

The method can further comprise the step of generating audible user-progress notifications during the course of the enrollment.

The method can further comprise the step of audibly prompting the user in a first voice and playing said text phrases in a second voice.

The method can comprise the step of audibly playing at least some of the text phrases from recorded audio, audibly playing at least some of the text phrases with a text-to-speech engine, or both. Similarly, the user can be audibly prompted from recorded audio, with a text-to-speech engine, or both.

The method can further comprise the steps of: generating a graphical user interface concurrently with the step of generating the audio user interface; and, displaying text corresponding to the text phrases and to the audible prompts.

The method can further comprise the steps of: displaying a plurality of icons for user activation; and, selectively distinguishing different ones of the plurality of icons at different times by at least one of: color; shape; and, animation.

A computer apparatus programmed with a set of instructions stored in a fixed medium, for enrolling a user in a speech recognition system without requiring reading, in accordance with the inventive arrangements, comprises: means for generating an audio user interface having an audible output and an audio input; means for audibly playing a text phrase; and, means for audibly prompting the user to speak the played text phrase.

The apparatus can further comprise means for generating audible user-progress notifications during the course of the enrollment.

The means for audibly playing the text phrases can comprise means for playing back prerecorded audio, a text-to-speech engine, or both.

The apparatus can further comprise: means for generating a graphical user interface concurrently with the audio user interface; and, means for displaying text corresponding to the text phrases and to the audible prompts.

The apparatus can also further comprise: means for displaying a plurality of icons for user activation; and, means for selectively distinguishing different ones of the plurality of icons at different times by at least one of: color; shape; and, animation.

DETAILED DESCRIPTION OF THE PREFERRED EMBODIMENTS

A prerequisite step in any enrollment process is preparing an enrollment script for a user. In general, the enrollment script should include a thorough sampling of sounds and sound combinations. Various schemes, such as successively highlighting words as they are spoken, can be used to guide users through reading the enrollment script from a display. For non-readers and for users without access to display devices, other factors must taken into consideration. Enrollment text for the script must be selected or composed with the variety of sounds that are helpful for initial training of the speech recognition engine. Each sentence in the enrollment script must be divided into its constituent or component phrases. Each enrollment text phrase should correspond to a linguistically complete unit, so each phrase will be easy for the user to remember. Each phrase should contain no more than one or two units to avoid exceeding user short-term memory limits. Units are linguistic components, such as prepositional phrases.

Figure 1A:
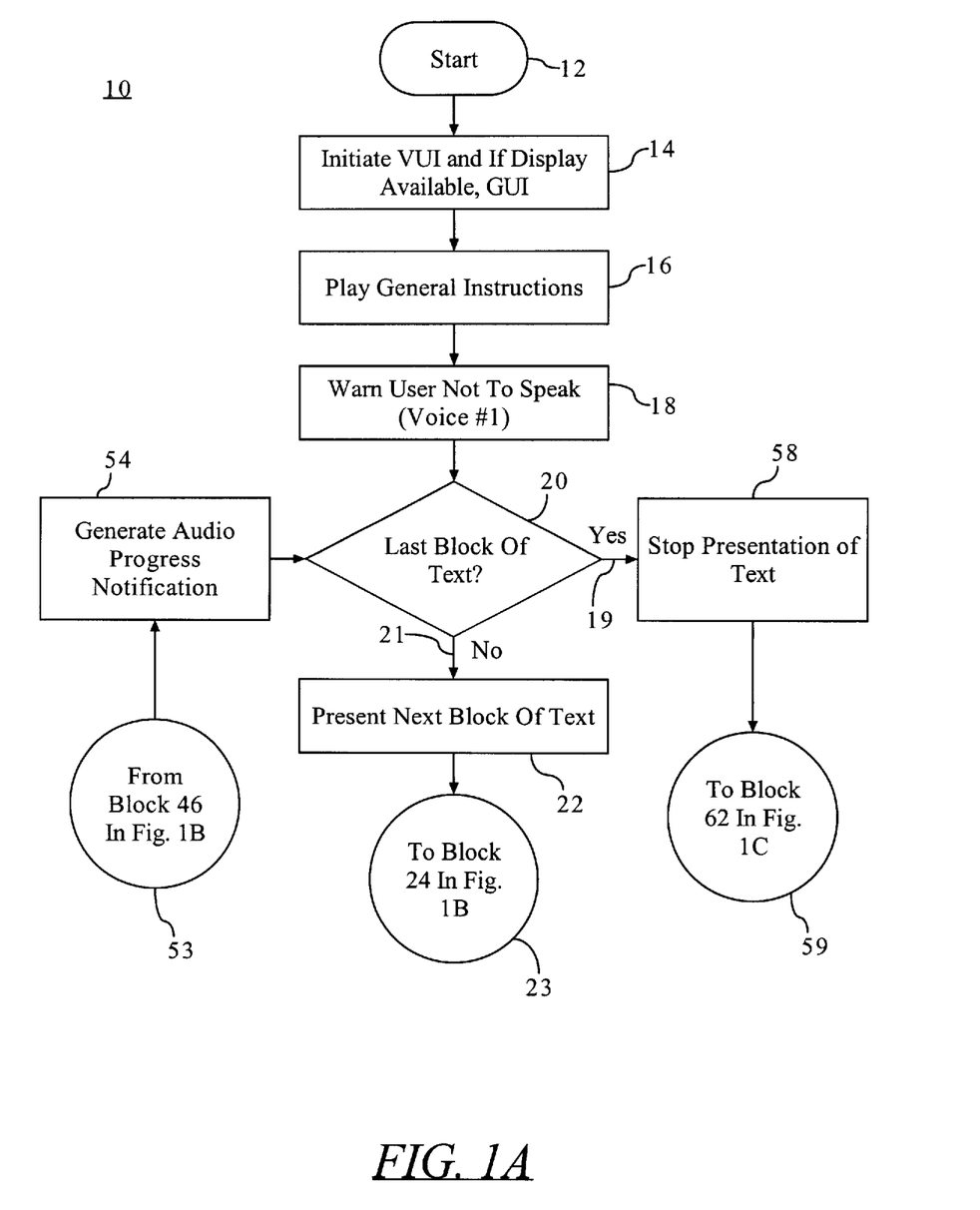
FIGS. 1A, 1B and 1C are, taken together, a flow chart useful for explaining enrollment of non-readers in a speech application and enrollment of any user in the speech application without a display device.
Figure 1B:
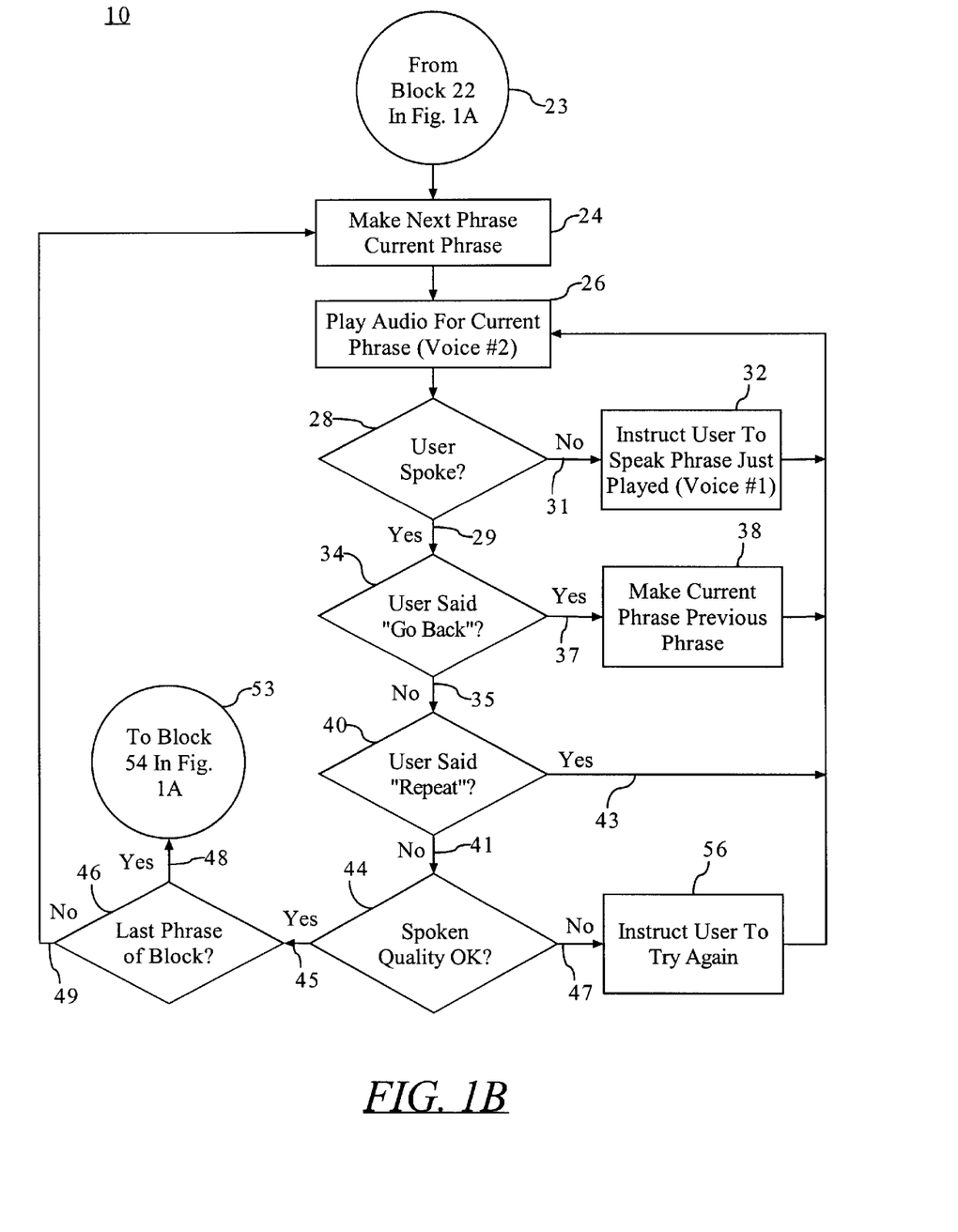
Figure 1C:
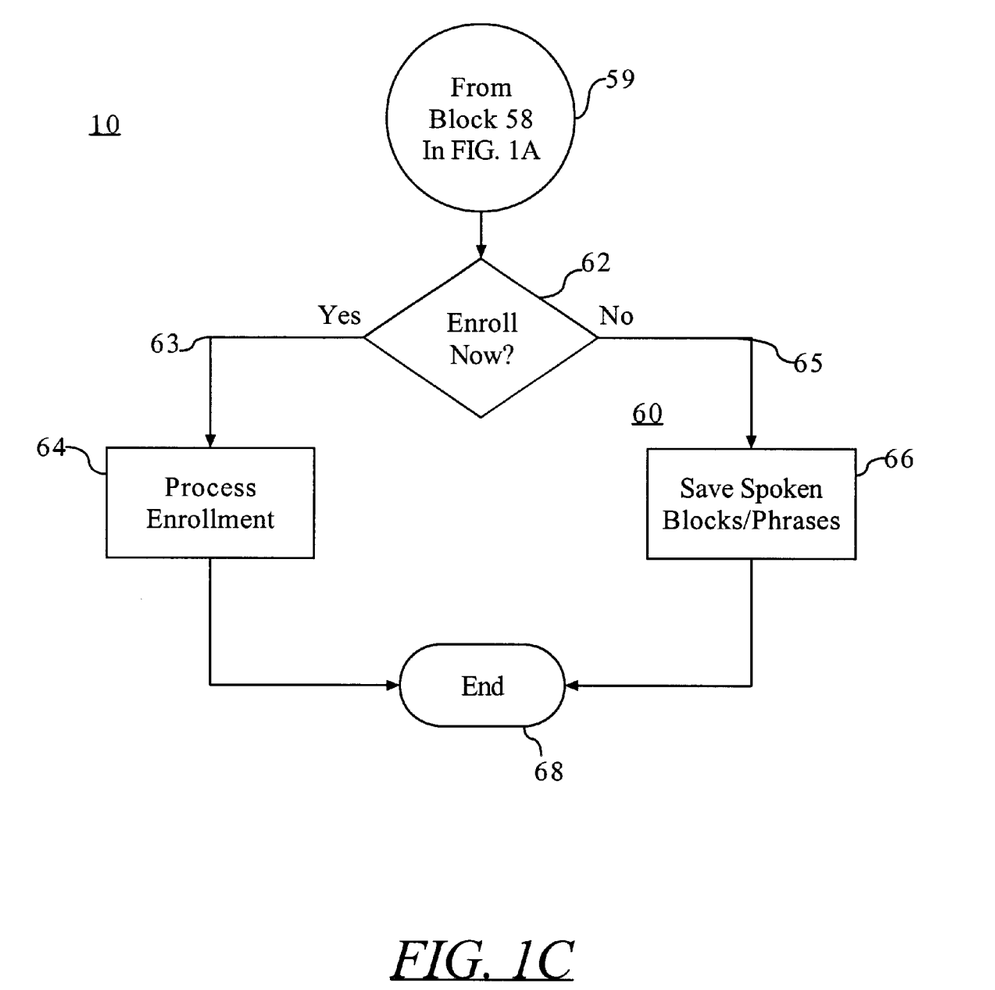

An enrollment process 10 for use with non-readers and for use without a display device is shown in three parts in FIGS. 1A, 1B and 1C. The division of the flow chart between FIGS. 1A and 1B is merely a matter of convenience as the entire flow chart would not fit on one sheet of drawings. The routine shown in FIG. 1C is optional and not directly related to the inventive arrangements. The steps in process 10 represent an ideal system for guiding a non-reader, or a user without access to a display, through an enrollment process. For purposes of this description, it should be assumed that whenever supplemental text such as instructions, text and commands are provided to the user, the instructions, text and commands are at least audibly played for the user. The supplemental text can be generated by playing back recorded audio, or can be generated by a text-to-speech (TTS) engine, or both.

The enrollment process 10 starts with step 12, as shown in FIG. 1A. A voice user interface (VUI) is initiated in accordance with step 14. If a display device is available, generation of a graphical user interface (GUI) is also initiated. The method represented by the steps of the flow chart can be implemented in a displayless device without having the benefit of a GUI, but for purposes of this description, it will be assumed that a display device is available. Accordingly, supplemental text also can appear as in the window of a graphical user interface as explained more fully in connection with FIGS. 3–9.

General instructions on how to complete the enrollment process are played in accordance with step 16. The general instructions can also be displayed, preferably in a manner coordinated with the audio output. Initially, the use of only a VUI will be considered. In this situation, all users, not just non-readers, require audio assistance to complete enrollment. In accordance with step 18, the user can be instructed, or reminded if previously instructed in step 16, to remain silent while each phrase is played, and after each phrase is played, to then speak each phrase. This instruction is played in voice 1.

In accordance with step 20, a determination is made as to whether the last block of enrollment text has been played. If not, the method branches on path 21 to step 22, in accordance with which the next block of text is presented. At this point, the method moves from jump block 23 in FIG. 1A to jump block 23 in FIG. 1B. The next phrase in the enrollment text of the current block is then made the current phrase in accordance with step 24, and the current phrase is played in accordance with step 26. The current phrase is played in voice 2. After the current phrase is played, the user is expected to speak the phrase of the enrollment text just played.

The speech recognition engine makes a determination in accordance with decision step 28 as to whether any words were spoken by the user. If the use has spoken any words, the method branches on path 29 to decision step 34. If the user has not spoken, the method branches on path 31 to step 32, in accordance with which the user is instructed to speak the phrase just played. The instruction is played in voice 1 and then the method returns to step 28.

If words are spoken by the user, a determination is made in accordance with decision step 34 as to whether the user has spoken the command "Go Back". This enables the user to re-dictate earlier phrases. If the "Go Back" command has been spoken, the method branches on path 37 to step 38, in accordance with which the current phrase is made the previous phrase. Thereafter, the method returns to step 26. If the "Go Back" command is not spoken, the method branches on path 35 to the step of decision block 40.

In accordance with decision step 40, a determination is made as to whether the user spoke the command "Repeat". This enables the user to re-dictate the current phrase. If the "Repeat" command has been spoken, the method branches on path 43 and the method returns to step 26. If the "Repeat" command is not spoken, the method branches on path 41 to decision step 44.

In accordance with decision step 44, a determination is made as to whether the spoken quality of the phrase is acceptable (OK). The phrase is acceptable if it is decoded properly and corresponds to the played phrase. The phrase is not acceptable if the wrong words are spoken, if the correct words are not fully decodeable or if the phrase is not received. The phrase will not be received, for example, if the user fails to speak the phrase, the phrase is overwhelmed by noise or other interference or the input of the audio interface fails.

If the phrase spoken is not acceptable, the method branches on path 47 to step 56, in accordance with which the user is instructed to try again, and the method returns to step 26. In one alternative, for example, the user can request an opportunity to repeat the phrase again without being prompted, or indeed, without having the phrase played again. As a general guideline, when the user pronunciations are acceptable for use, the method moves through the phrases in a normal fashion. If at any time one or more words have unacceptable pronunciations, the method provides for repetition of the presentation of the problem word or words.

If the phrase spoken is acceptable, the method branches on path 45 to decision step 46, in accordance with which a determination is made as to whether the last phrase of the current block has been played and repeated. If not, the method branches on path 49 back to step 24. If the last phrase of the current block has been played and repeated, the method branches on path 48. At this point, the method moves from jump block 53 in FIG. 1B to jump block 53 in FIG. 1A. In FIG. 1A, jump block 53 leads to step 54, in accordance with which an audible enrollment progress notification can be generated.

The method returns to decision step 20 after the notification. If the last block of text has not been played, the method branches on path 19 to step 22, in accordance with which the next block of text is presented, as explained above. If the last block of text has been presented, the method branches on path 21 to step 58, in accordance with the presentation of text is stopped.

After the presentation of text has stopped, the user can be provided with the option of enrolling now or deferring enrollment. An enrollment routine 60 is shown in FIG. 1C, and is accessed by related jump blocks 59 in FIGS. 1A and 1C. The user can be presented with a choice of enrolling now, or enrolling later, in accordance with step 62. If the user chooses to enroll now, the method branches on path 63 to step 64, in accordance with which the enrollment is processed on the basis of the spoken phrases. Thereafter, the method ends at step 68. If enrollment is deferred, the method branches on path 65 to step 66, in accordance with which the spoken phrases of the blocks of text of the enrollment script are saved for later enrollment processing. Thereafter, the method ends at step 68.

The method can be advantageously implemented using different voices for the audio of the text phrases of the enrollment script on the one hand, and the audio of the instructions and feedback on the other hand. The use of different voices can be appreciated from the following exemplary dialog depicted in Table 1.

TABLE 1

| VOICE | AUDIO/MESSAGE |
|---|---|
| Voice 1: | During this enrollment you will hear or read 77 short phrases, repeating each phrase after the narrator. This excerpt from Treasure Island written by Robert Louis Stevenson in 1882. This is a special version of this story, with all rights reserved by IBM. When you repeat the sentence, speak naturally and as clearly as possible. If you want to go back to a sentence say "go back". OK let's begin. Repeat each sentence aloud after the narrator reads it. |
| Voice 2: | Now repeat after me, THE OLD PIRATE This is the story of (Continues for about 18 more phrases) |
| Voice 1: | Your enrollment dictation is 25% complete |
| Voice 2: | His hair fell over the shoulders of his dirty blue coat. (Continues for about 18 more phrases) |

TABLE 1-continued

| VOICE | AUDIO/MESSAGE |
|---|---|
| Voice 1: | Your enrollment dictation is 50% complete |
| Voice 2: | He kept looking at the cliffs and up at our sign. (Continues for about 18 more phrases) |
| Voice 1: | Your enrollment dictation is 75% complete |
| Voice 2: | Oh, I see what you want. He threw down three or four gold pieces (Continues for about 18 more phrases) |
| Voice 1: | Congratulations, you have completed enrollment dictation |
| Crowd | "Cheering" earcon |

An earcon is an audible counterpart of an icon.

Use of the method 10 with a graphical user interface (GUI) is illustrated by the succession of display screens 100 shown in FIGS. 2–8. These display screens represent a variation and extension of the existing ViaVoice Gold enrollment dialog, to accommodate the additional features required to support enrollment for non-readers and those without display devices. Specifically, the GUI can be used to display text which supplements the enrollment text. Notably, ViaVoice Gold® is a speech recognition application available from IBM®.

It is difficult to illustrate the manner in which parts of the supplemental text and other icons and buttons can be distinguished for non-readers in conventional drawings, as the preferred method for showing such distinctions is the use of color. Reference to color can be easily made by the audible instructions when a display device is available. Other methods applicable to text include boxes, underlining, bold and italic fonts, background highlighting and the like. The non-color reliant alternatives are useful with monochrome display devices and for readers and non-readers who are color-blind. The TTS engine can generate the following instruction, for example, "When the arrow on the hourglass icon changes from yellow to green, read the green words." One can substitute bold, italic or underlined, for example, for green words. In FIGS. 2–8 different colors are indicated by respective cross-hatched circles, and in the case of portions of text, the portions are surrounded by dashed-line boxes.

In each case, the first block of supplemental text is, "To enroll you need to read these sentences aloud, COMMA speaking naturally and as clearly as possible, COMMA then wait for the next sentence to appear". Phrases, or portions, of this text are played by the TTS engine, or played from a recording, or a combination of both, after which the user repeats the text. The GUI enables the user to at least also see the supplemental text, if not read the text, when a display device is available.

Figure 2:
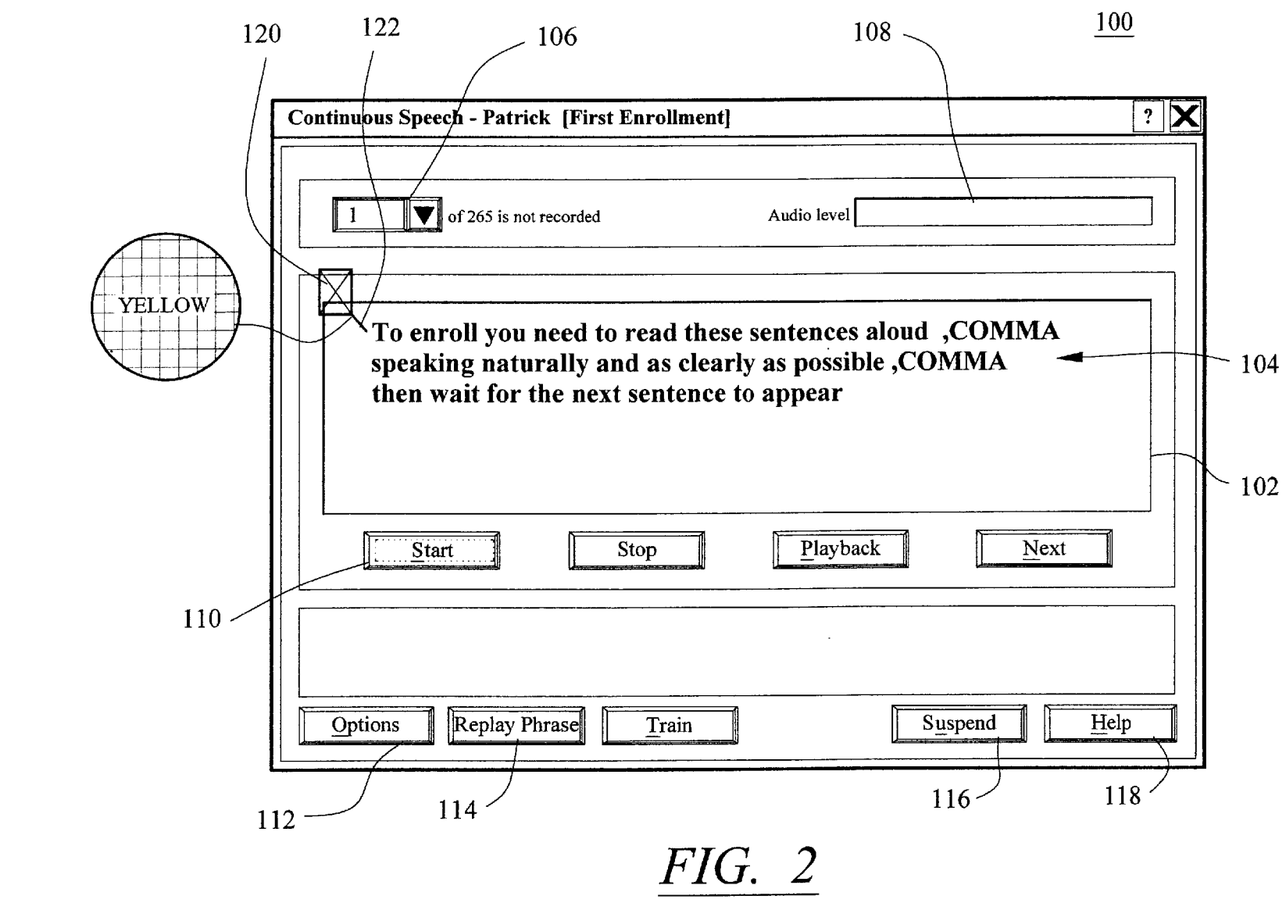
FIGS. 2–8 illustrate successive variations of a display screen of an enrollment dialog for non-readers generated by a graphical user interface (GUI) in accordance with the inventive arrangements.

FIG. 2 shows a display screen 100, having a window 102 in which the blocks of text 104 appear. In a manner similar to the ViaVoice Gold enrollment screen, the display screen 100 has text block counter 106, an audio level meter icon 108, a Start button icon 110, an Options button icon 112, a Replay phrase button icon 114, a Suspend button icon 116 and a Help button icon 118. In the ViaVoice Gold enrollment screen, the button icon 114 is Play Sample. The remaining button icons are greyed, and are unnecessary for understanding the inventive arrangements.

An instructional icon 120 in the form of an hourglass is an indicator that the system is preparing to play the first phrase of the block of text. In accordance with a presently preferred embodiment, the hourglass has a yellow arrow 122 pointing to the first word of the current phrase. In each of FIGS. 2–8, the buttons icons with text labels are not appropriate for non-readers. The button icons can be different colors, so that system instructions can be played which, for example, prompt a user to, "Now click the green button".

Figure 3:
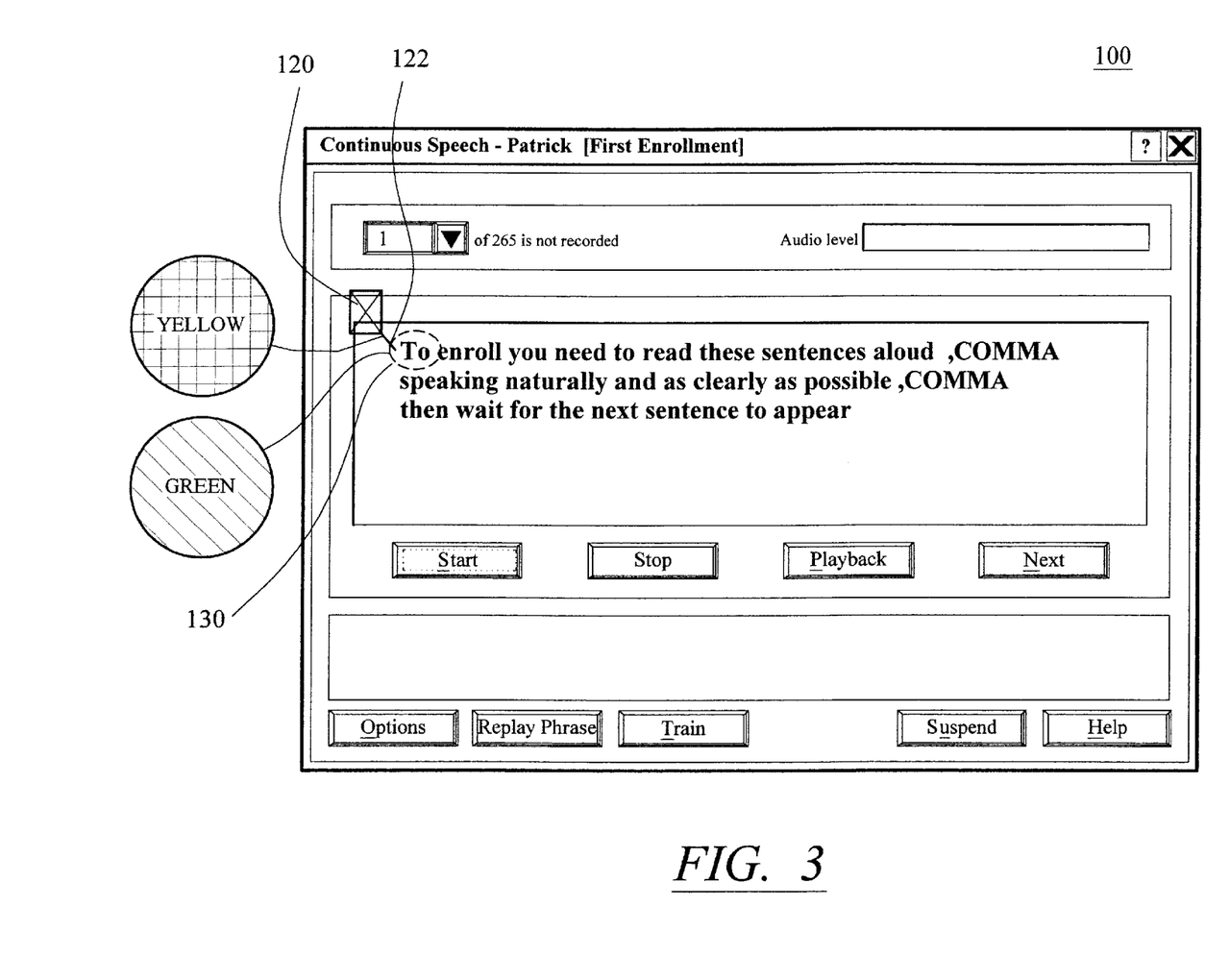

In FIG. 3 the system begins playing the audio for the current phrase. The arrow 122 is still yellow and the first word "To" is shown as being green and is in box 130. In this representation, as each word plays, the color of each word changes from black to green. This extra feature helps the non-reader associate the appropriate audio with each word and provides a focus point for readers.

Figure 4:
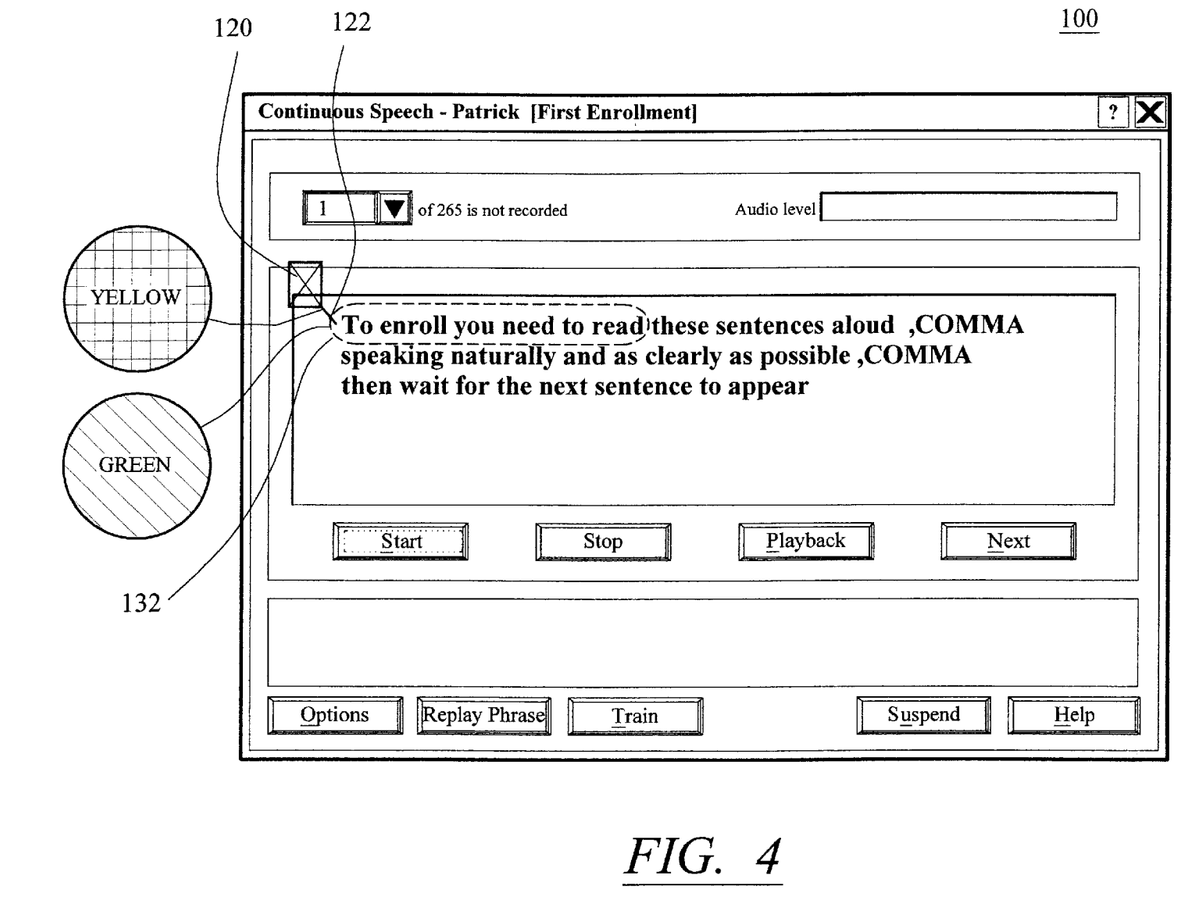

In FIG. 4 all of the current phrase of the first block of the enrollment dialog is green and enclosed by box 132, as the system produces audio for the last word in the current phrase. The arrow 122 of hourglass 120 is still yellow.

Figure 5:
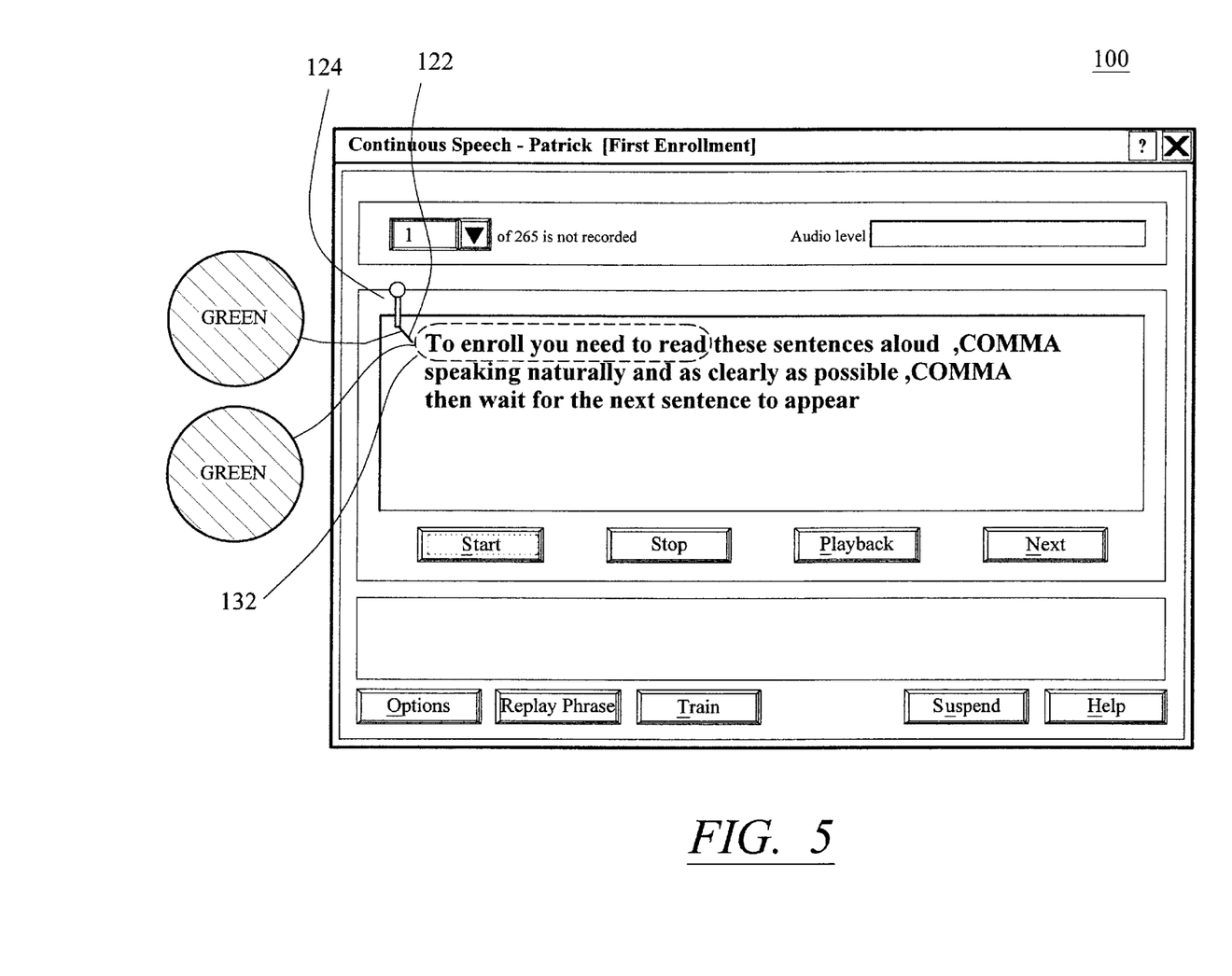

In FIG. 5, the system indicates to the user by means of a microphone icon 124, and the arrow 122 turned to green, that the user is now to repeat the phrase just played by the system. Optionally, the user can click the Replay Phrase button icon to hear the phrase again. If the user elects this option, the system returns to the state shown in FIG. 2.

Figure 6:
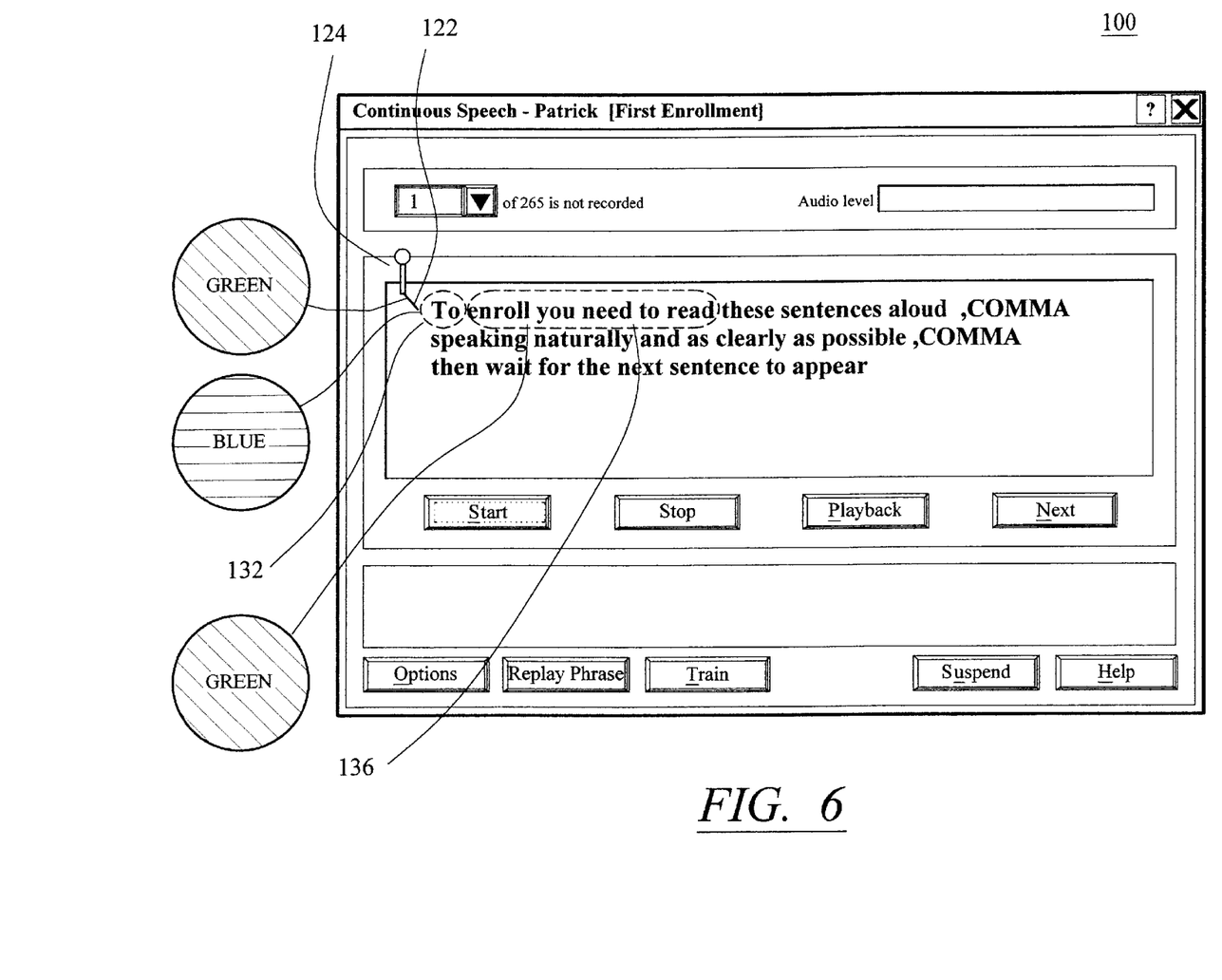

In the alternative shown in FIG. 6, as the user repeats the phrase, the system changes the color of each word to blue to indicate correct pronunciation of the word. At least, the pronunciation is correct enough for the system to use this audio in constructing the acoustic model for the user. For this procedure to work well, the system criteria for accepting user pronunciations should be as loose as possible. Accordingly, the arrow 122 is green, the first word "To" is blue and in a box 134, and the rest of the current phrase is green, and in a box 136.

Figure 7:
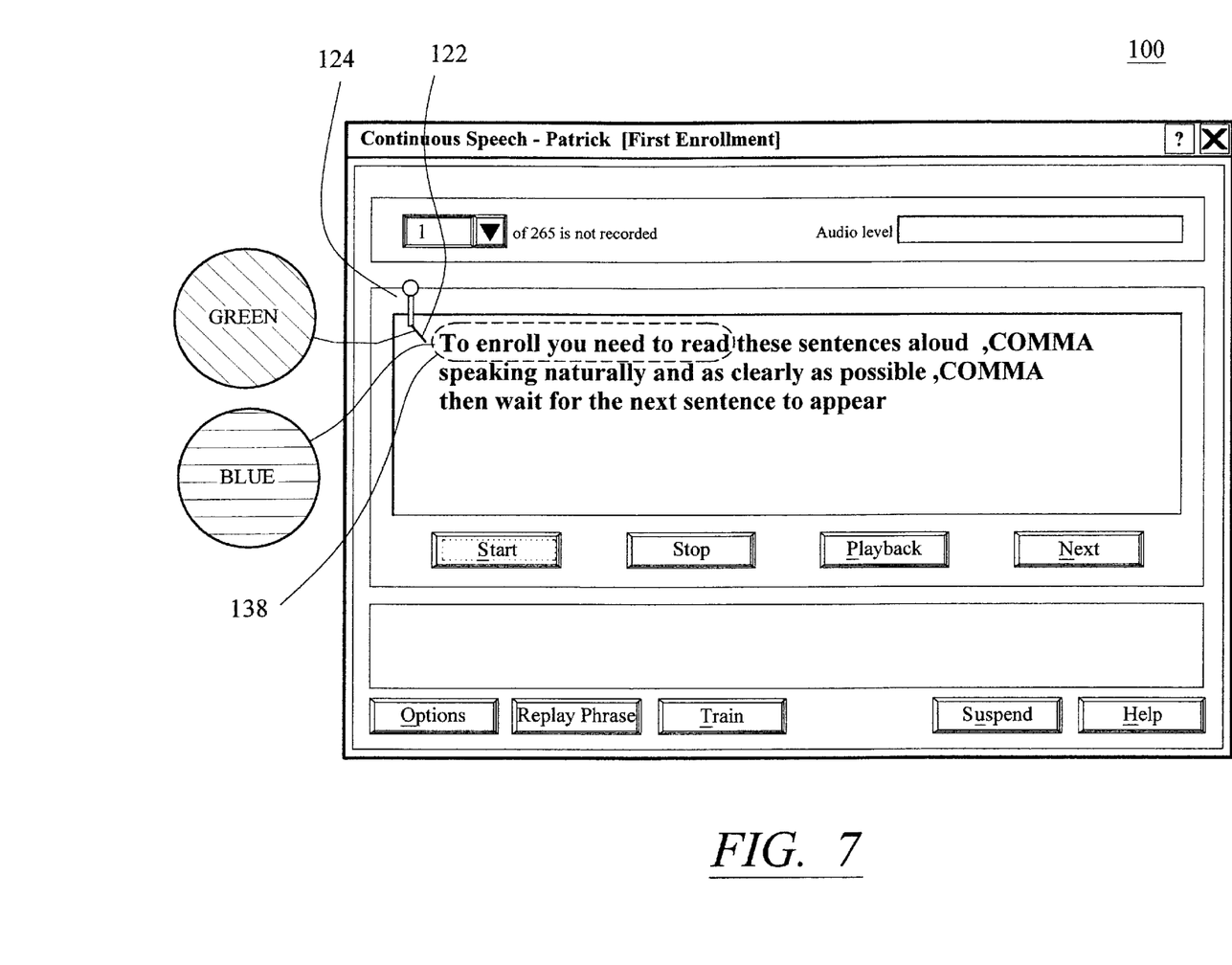

In FIG. 7, the user has finished repeating the phrase, and the system has accepted all the pronunciations. Accordingly, all of the current phrase is blue, and in box 138. After this, for example about 250–500 ms later, the system would repeat the steps illustrated by FIGS. 2 through 7 for the next phrase of the block, for example, "these sentences aloud COMMA".

Figure 8:
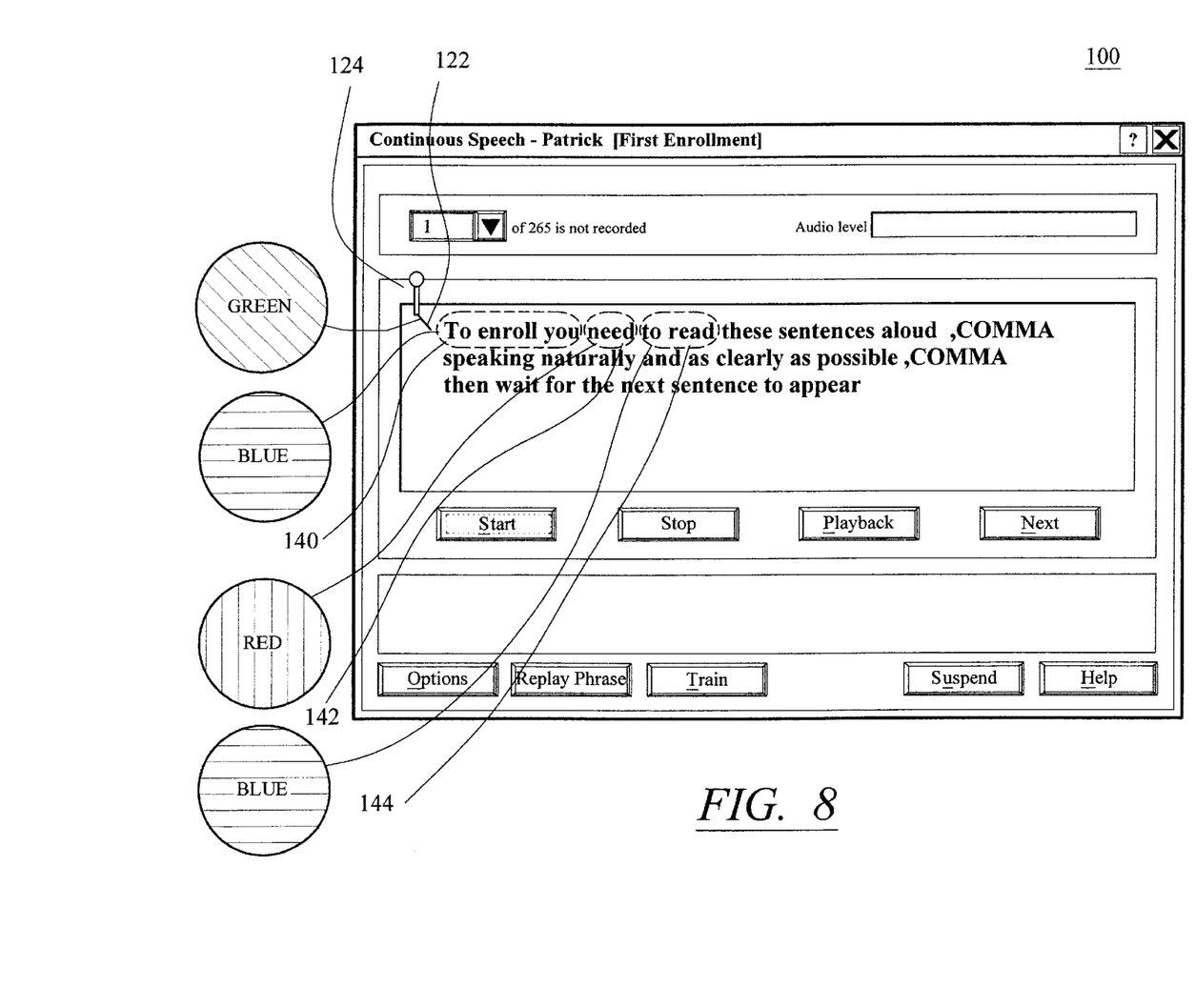

FIG. 8 illustrates how changing a word to a different color, for example red, when the user's pronunciation is too deviant to allow use of the word in calculating the user's acoustic model. The arrow 122 is green. The part of the phrase "To enroll you" is blue and in box 140. The part of the phrase "to read" is also in blue and in box 144. The deviant word, "need" is in red and in box 142.

When only an occasional word appears in red, the user can be instructed to click the Next button icon to continue, as the button icon is ungreyed. If any words are changed to red (an indicator that the word or words are too deviant for use), the user can be instructed to click on red words to re-record the words or the whole phrases, using Start button icon. In this alternative, the instructional text can appear in the window 150 between buttons at the bottom of the display screen, accompanied by and audio instruction, for example, "Say 'need'". The procedure for getting a recording of the red word would be identical to that for doing the phrase, except the system to elicit a pronunciation for the red word. If the acoustic context were required, the system would elicit a pronunciation for the red word and the words preceding and following the red word.

In other words, the system would read the target words, with the set of target words indicated by the hourglass/ yellow arrow icon. After that, the icon would change to the microphone/green arrow icon and the user would repeat the phrase. If after some programmed number of tries, for example three tries, the recorded pronunciation remained too deviant to use, the system would move on automatically, either to the next red word or to the next phrase, as appropriate.

The inventive arrangements provide a new enrollment procedure appropriate for helping non-readers, or poor readers, or readers whose primary fluency is in a different language, to complete enrollment in a voice recognition system. In the case of a device without a display, enrollment is possible irrespective of reading facility. Although the technology of unsupervised enrollment, that is performing additional acoustic analysis using stored audio from real dictation sessions, is expected to become feasible in the future, users will always benefit from at least some initial enrollment, and non-readers or poor readers will benefit as well given a system in accordance with the inventive arrangements.

Figure 9:
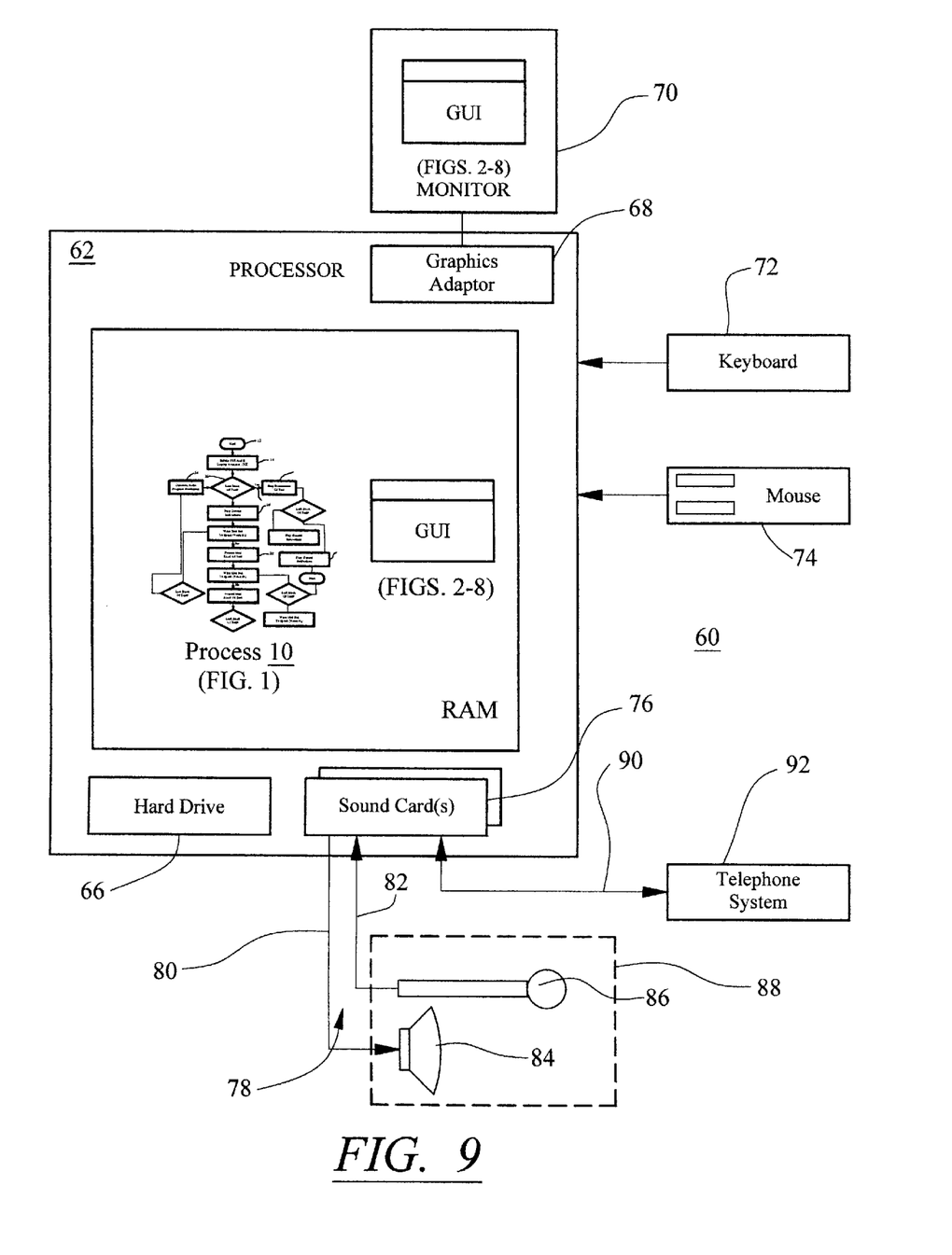
FIG. 9 is a block diagram of a computer apparatus programmed with a routine set of instructions for implementing the method shown in FIG. 1, generating the display screens of the GUI shown in FIGS. 2–8 and operating in conjunction with a displayless telephone system.

The methods of the inventive arrangements can be implemented by a computer apparatus 60, shown in FIG. 9, and provided with a routine set of instructions stored in a fixed medium. The computer 60 has a processor 62. The processor 62 has a random access memory (RAM) 64, a hard drive 66, a graphics adaptor 68 and one or more sound cards 76. The RAM 64 is diagrammatically shown as being programmed to perform the steps of the process 10 shown in FIG. 1 and to generate the display screens shown in FIGS. 2–8. A monitor 70 is driven by the graphics adaptor 68. Commands are generated by keyboard 72 and mouse 74. An audio user interface 78 includes a speaker 84 receiving signals from the sound card(s) 76 over connection 80 and a microphone 86 supplying signals to the sound card(s) 76 over connection 82. The microphone and speaker can be combined into a headset, indicated by dashed line box 88.

The computer apparatus can also be connected to a telephone system 92, though an interface 90. Users can access the speech recognition application by telephone and enroll in the application without a display device.

The inventive arrangements rely on several important features, including: breaking up the enrollment script into easily repeated sub-sentence phrases, unless the sentence is so short that it is essentially a single phrase; and, providing the correct pronunciation for a phrase, using either TTS or stored audio, before the user's production of that phrase in an enrollment dialog for speech recognition systems. For systems with displays, additional features include: the use of visual feedback to help users see which audio goes with which words when the system is providing the audio for the phrase; letting the user know when to begin reading; and, providing feedback about which words had acceptable and unacceptable pronunciations.

What is claimed is:

1. A method for audibly enrolling a user in a speech recognition system without requiring reading, comprising the steps of:

generating an audio user interface having an audible output and an audio input;

audibly playing an enrollment text phrase from an enrollment script;

audibly prompting the user to speak said played enrollment text phrase without displaying said enrollment text phrase in a visual user interface;

repeating said steps of audibly playing said enrollment text phrase and audibly prompting the user to speak, for a plurality of further enrollment text phrases in said enrollment script without displaying said enrollment text phrase in a visual user interface; and, processing enrollment of the user based on said audibly prompted and subsequently spoken enrollment text phrases.

2. The method of claim 1, further comprising the step of audibly playing a further one of said plurality of further enrollment text phrases only if said spoken phrase was received.

3. The method of claim 1, further comprising the step of repeating said steps of audibly playing said enrollment text phrase and audibly prompting the user to speak for said most recently played enrollment text phrase if said spoken enrollment text phrase was not received.

4. The method of claim 3, further comprising the step of audibly prompting the user, prior to said audibly playing step, not to speak while said enrollment text phrase is played.

5. The method of claim 1, further comprising the step of generating audible user-progress notifications during the course of the enrollment.

6. The method of claim 1, further comprising the step of audibly prompting the user in a first voice and playing said enrollment text phrases in a second voice, wherein first and second voices assist the user in distinguishing between text phrases for enrollment and instructions.

7. The method of claim 1, comprising the step of audibly playing at least some of said enrollment text phrases from recorded audio.

8. The method of claim 1, comprising the step of audibly playing at least some of said enrollment text phrases with a text-to-speech engine.

9. The method of claim 1, comprising the step of audibly prompting the user from recorded audio.

10. The method of claim 1, comprising the step of audibly prompting the user with a text-to-speech engine.

11. The method of claim 1, further comprising the steps of:
generating an enrollment graphical user interface (GUI) concurrently with said step of generating said audio user interface; and,
displaying text in said GUI which supplements said enrollment text phrases and said audible prompts.

12. The method of claim 1, further comprising the steps of:
displaying a plurality of icons for user activation; and,
selectively distinguishing different ones of said plurality of icons at different times by at least one of:
color;
shape; and,
animation.

13. The method of claim 1, further comprising the steps of:
generating an enrollment graphical user interface (GUI) concurrently with said step of generating said audio user interface;
displaying text in said GUI which supplements said enrollment text phrases and said audible prompts;
displaying a plurality of icons within said GUI for user activation; and,
selectively distinguishing different ones of said plurality of icons at different times by at least one of:
color;
shape; and,
animation.

14. A computer apparatus programmed with a set of instructions stored in a fixed medium, for enrolling a user in a speech recognition system without requiring reading, said programmed computer apparatus comprising:
means for generating an audio user interface having an audible output and an audio input;
means for audibly playing an enrollment text phrase; and,
means for audibly prompting the user to speak said played enrollment text phrase without displaying said enrollment text phrase in a visual user interface.

15. The apparatus of claim 14, further comprising means for generating audible user-progress notifications during the course of the enrollment.

16. The apparatus of claim 14, wherein said means for audibly playing said enrollment text phrases comprises means for playing back prerecorded audio.

17. The apparatus of claim 14, wherein said means for audibly playing said enrollment text phrases comprises a text-to-speech engine.

18. The apparatus of claim 14, further comprising:
means for generating a graphical user interface (GUI) concurrently with said audio user interface; and,
means for displaying in said GUI text which supplements said enrollment text phrases and said audible prompts.

19. The apparatus of claim 14, further comprising:
means for displaying a plurality of icons for user activation; and,
means for selectively distinguishing different ones of said plurality of icons at different times by at least one of:
color;
shape; and,
animation.

20. The apparatus of claim 14, further comprising:
means for generating an enrollment graphical user interface (GUI) concurrently with said step of generating said audio user interface;
means for displaying in said GUI text which supplements said enrollment text phrases and said audible prompts;
means for displaying a plurality of icons within said GUI for user activation; and,
means for selectively distinguishing different ones of said plurality of icons at different times by at least one of:
color;
shape; and,
animation.

* * * * *